(12) United States Patent
Li et al.

(10) Patent No.: US 11,769,260 B2
(45) Date of Patent: Sep. 26, 2023

(54) CROSS-CAMERA OBSTACLE TRACKING METHOD, SYSTEM AND MEDIUM

(71) Applicant: APOLLO INTELLIGENT DRIVING TECHNOLOGY (BEIJING) CO., LTD., Beijing (CN)

(72) Inventors: Guo Li, Beijing (CN); Han Gao, Beijing (CN); Xun Sun, Beijing (CN); Jun Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/545,697

(22) Filed: Dec. 8, 2021

(65) Prior Publication Data

US 2022/0101540 A1 Mar. 31, 2022

Related U.S. Application Data

(63) Continuation of application No. 17/035,196, filed on Sep. 28, 2020, now Pat. No. 11,238,600.

(30) Foreign Application Priority Data

Jan. 7, 2020 (CN) .......................... 202010014794.2

(51) Int. Cl.
*G06K 9/00* (2022.01)
*G06T 7/292* (2017.01)
(Continued)

(52) U.S. Cl.
CPC ............... *G06T 7/292* (2017.01); *B60R 1/00* (2013.01); *G06V 20/58* (2022.01); *H04N 23/695* (2023.01);
(Continued)

(58) Field of Classification Search
CPC ............ G06V 20/58; G06T 7/292; G06T 2207/30261; B60R 1/00; B60R 11/04;
(Continued)

(56) References Cited

U.S. PATENT DOCUMENTS 10,761,538 B2 * 9/2020 Ball ..................... G06N 5/048
2004/0246336 A1 * 12/2004 Kelly, III ............... G06V 10/28
348/E7.086
(Continued)

FOREIGN PATENT DOCUMENTS

JP  2001088609 A  4/2001
JP  2004072628 A  3/2004
(Continued)

OTHER PUBLICATIONS

Office Action for Korean Application No. 10-2021-0002057, dated Dec. 30, 2021, 9 pages.
(Continued)

*Primary Examiner* — Howard D Brown, Jr.
(74) *Attorney, Agent, or Firm* — Lippes Mathias LLP

(57) ABSTRACT

Embodiments of the present provide a cross-camera obstacle tracking method, system and medium. The method includes: obtaining obstacle tracking results of images captured by at least two cameras, wherein each obstacle tracking result comprises results after identifying and tracking at least one obstacle in the image captured by each camera, and each obstacle is labeled with a local identifier for each camera; in response to a triggering condition of a main camera in the cameras to fusion of cross-camera obstacles being satisfied, establishing a mapping relation between local identifiers of the obstacles in the cameras and global identifiers according to the obstacle tracking result of each of the cameras; determining similarities of obstacles according to the obstacle tracking result of each of the cameras, and performing fusion of the global identifiers on the same obstacle according to the similarities; and obtaining final obstacle tracking results labeled with the global identifiers.

18 Claims, 3 Drawing Sheets

(51) Int. Cl.
  *B60R 1/00* (2022.01)
  *G06V 20/58* (2022.01)
  *H04N 23/695* (2023.01)

(52) U.S. Cl.
  CPC ... *B60R 2300/105* (2013.01); *B60R 2300/303* (2013.01); *B60R 2300/8093* (2013.01)

(58) Field of Classification Search
  CPC ........ B60R 2300/105; B60R 2300/303; B60R 2300/8093; B60W 40/02; B60W 30/08; B60W 2050/0005; B60W 2050/0052; B60W 2420/42; B60W 2552/50; G06K 9/00805; H04N 5/23299
  See application file for complete search history.

(56) References Cited

U.S. PATENT DOCUMENTS

| | | | | |
|---|---|---|---|---|
| 2005/0197923 | A1* | 9/2005 | Kilner | G06V 20/52 |
| | | | | 382/118 |
| 2006/0028552 | A1* | 2/2006 | Aggarwal | G08B 13/19673 |
| | | | | 348/169 |
| 2010/0208941 | A1* | 8/2010 | Broaddus | G08B 13/19645 |
| | | | | 382/103 |
| 2018/0181118 | A1* | 6/2018 | Yoneda | G05D 1/0022 |
| 2018/0189573 | A1* | 7/2018 | Divakaran | G06V 20/52 |
| 2019/0294889 | A1* | 9/2019 | Sriram | G06F 18/24143 |
| 2020/0175694 | A1* | 6/2020 | Kato | G06T 7/90 |
| 2021/0190936 | A1* | 6/2021 | Sabripour | G01S 13/70 |
| 2021/0409650 | A1* | 12/2021 | Kobayashi | H04W 72/02 |
| 2022/0383522 | A1* | 12/2022 | Lai | G06T 7/292 |
| 2023/0100474 | A1* | 3/2023 | Bentfeld | G05B 19/19 |
| | | | | 318/135 |

FOREIGN PATENT DOCUMENTS

| | | |
|---|---|---|
| JP | 2013093865 A | 5/2013 |
| JP | 2018061114 A | 4/2018 |
| JP | 2019114280 A | 7/2019 |
| JP | 2019185615 A | 10/2019 |

OTHER PUBLICATIONS

Office Action for Japanese Application No. 2021-001461, dated Oct. 25, 2022, 5 pages.

* cited by examiner

CROSS-CAMERA OBSTACLE TRACKING METHOD, SYSTEM AND MEDIUM

CROSS REFERENCE TO RELATED APPLICATION

This application is a continuation application of U.S. patent application Ser. No. 17/035,196, filed on Sep. 28, 2020, which claims priority from Chinese patent application No. 202010014794.2, filed on Jan. 7, 2020, the entire content of which is hereby introduced into this application as a reference.

TECHNICAL FIELD

Embodiments of the present disclosure relate to a field of intelligent transportation technologies, and more particularly, relates to automatic driving technologies. In detail, embodiments of the present disclosure provide a method, a system and a medium for cross-camera obstacle tracking.

BACKGROUND

With the development of communication technologies, autonomous driving technologies and unmanned driving technologies in transportation are developing.

SUMMARY

Embodiments of the present disclosure provide a method, a system and a medium for cross-camera obstacle tracking, to improve accuracy of tracking target objects.

In a first aspect, embodiments of the present disclosure provide a cross-camera obstacle tracking method. The method includes:

obtaining obstacle tracking results of images captured by at least two cameras, wherein each obstacle tracking result comprises results after identifying and tracking at least one obstacle in the image captured by each camera, and each obstacle is labeled with a local identifier for each camera;

in response to a triggering condition of a main camera in the cameras to fusion of cross-camera obstacles being satisfied, establishing a mapping relation between local identifiers of the obstacles in the cameras and global identifiers according to the obstacle tracking result of each of the cameras;

determining similarities of obstacles according to the obstacle tracking result of each of the cameras, and performing fusion of the global identifiers on the same obstacle according to the similarities; and obtaining final obstacle tracking results labeled with the global identifiers.

In a second aspect, embodiments of the present disclosure provide a cross-camera obstacle tracking system including at least two on-board cameras and an electronic device, in which the electronic device is configured to, obtain obstacle tracking results of images captured by at least two cameras, in which each obstacle tracking result comprises results after identifying and tracking at least one obstacle in the image captured by each camera, and each obstacle is labeled with a local identifier for each camera;

in response to a triggering condition of a main camera in the cameras to fusion of cross-camera obstacles being satisfied, establish a mapping relation between local identifiers of the obstacles in the cameras and global identifiers according to the obstacle tracking result of each of the cameras;

determine similarities of obstacles according to the obstacle tracking result of each of the cameras, and perform fusion of the global identifiers on the same obstacle according to the similarities; and obtain final obstacle tracking results labeled with the global identifiers.

In a third aspect, embodiments of the present disclosure provide a non-transitory computer-readable storage medium storing computer instructions, in which the computer instructions are used to enable the computer execute a cross-camera obstacle tracking method, the method includes:

obtaining obstacle tracking results of images captured by at least two cameras, in which each obstacle tracking result comprises results after identifying and tracking at least one obstacle in the image captured by each camera, and each obstacle is labeled with a local identifier for each camera;

in response to a triggering condition of a main camera in the cameras to fusion of cross-camera obstacles being satisfied, establishing a mapping relation between local identifiers of the obstacles in the cameras and global identifiers according to the obstacle tracking result of each of the cameras;

determining similarities of obstacles according to the obstacle tracking result of each of the cameras, and performing fusion of the global identifiers on the same obstacle according to the similarities; and obtaining final obstacle tracking results labeled with the global identifiers.

Additional effects of the above-mentioned optional modes are described below in combination with specific embodiments.

BRIEF DESCRIPTION OF THE DRAWINGS

The drawings are used to better understand the solution and do not constitute a limitation to the application, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

The embodiments of the present disclosure are applicable to a situation where a capacity of a processor of an unmanned driving system is limited, resulting in image information loss before processing, and the overall tracking effect being influenced.

Embodiment 1

Figure 1:
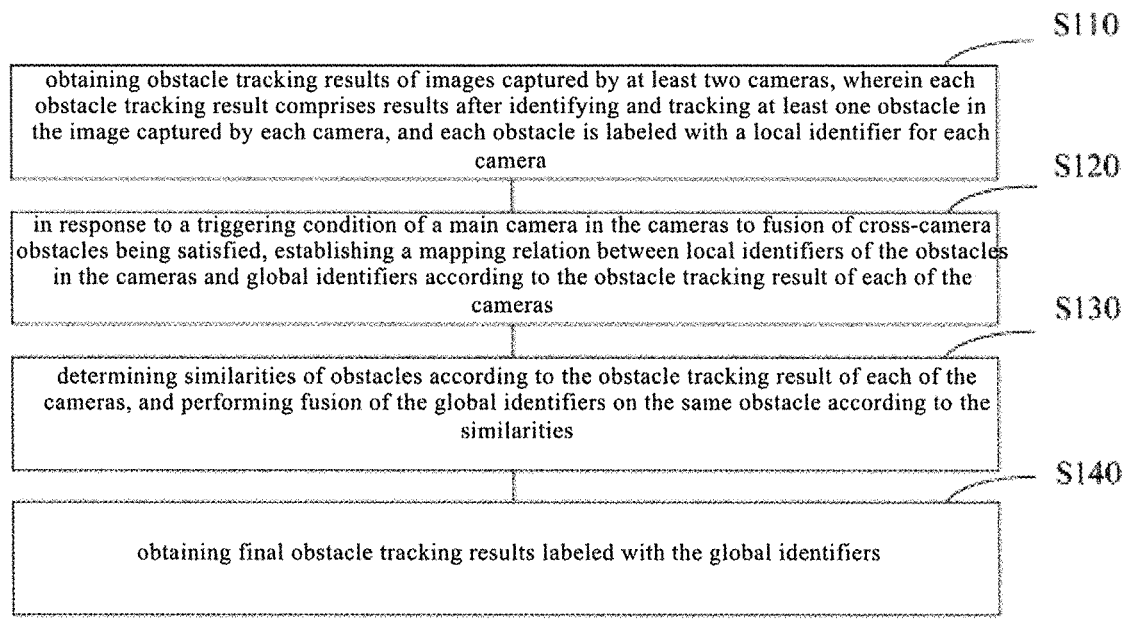
FIG. 1 is a flowchart of a cross-camera obstacle tracking method according to Embodiment 1 of the present disclosure.

FIG. 1 is a flowchart of a cross-camera obstacle tracking method according to Embodiment 1 of the present disclosure. This embodiment is used in a situation where an automatic driving vehicle identifies and tracks obstacles captured by cameras. The method may be executed by a cross-camera obstacle tracking apparatus, which may be implemented by software and/or hardware integrated into an electronic device, or an automatic driving control device integrated in the vehicle. As illustrated in FIG. 1, the cross-camera obstacle tracking method according to this embodiment may include the following steps.

At step S110, obstacle tracking results of images captured by at least two cameras are obtained, in which each obstacle tracking result includes results after identifying and tracking at least one obstacle in the image captured by each camera, and each obstacle is labeled with a local identifier for each camera.

The camera in this embodiment is mounted on a vehicle, which may be an unmanned vehicle or an automatic driving vehicle. In order for the vehicle to identify obstacles in various directions, cameras are installed at different positions of the vehicle, for example, in front of the vehicle, on the left side of the vehicle, on the right side of the vehicle, and at the rear of the vehicle. Each of these cameras installed at different positions of the vehicle may collect images at a frequency set by the camera itself.

In detail, the obstacle tracking results may be obtained by cameras mounted in the vehicle, or may be obtained by an industrial personal computer in the vehicle.

In this embodiment, the local identifier refers to an identifier used by a single camera or industrial personal computer to distinguish obstacles in the captured images. If the local identifier is preset by the single camera, the specific process is provided as follows. In the captured images, the single camera identifies at least one obstacle, and assigns a unique identifier relative to the single camera, that is, a local identifier, to the obstacle. When the camera continues to capture subsequent frame images, if the obstacle still appears in the images, the control program of the camera matches the obstacles that appear in the front and rear frame images to find images having the same obstacle, thereby obtaining different images of the obstacles having the same local identifier. The process may be called obstacle tracking. For example, Local_Track_ID is used as a local identifier for distinguishing and naming. In detail, different obstacles may be distinguished by different identifiers.

Alternatively, an execution subject of the method is an industrial personal computer, and obtaining the obstacle tracking results of the images captured by the at least two cameras includes:

obtaining images captured by at least two cameras on a vehicle after photographing surrounding environment of the vehicle; and identifying and tracking obstacles in each of the images to obtain the obstacle tracking results.

In this embodiment, if the local identifier is preset by an industrial personal computer, the specific process is provided as follows. After a single camera takes an image and sends the image to the industrial personal computer, and the industrial personal computer assigns a local identifier to the each of the obstacles in the image to facilitate obstacle tracking.

Alternatively, an execution subject of the method is an industrial personal computer, and obtaining the obstacle tracking results of the images captured by the at least two cameras includes:

obtaining the obstacle tracking results transmitted by the at least two cameras in a vehicle, in which the obstacle tracking results are obtained by the cameras through identifying and tracking the obstacles based on the captured images and setting the local identifiers.

In this embodiment, if the camera identifies and tracks the obstacles, after the single camera captures an image, an obstacle identification result of the current frame image is compared with the obstacles in the historical frame images identified by the camera to track the identified obstacles and assign local identifiers to the identified obstacles. Obstacle identification and tracking by the cameras at different positions may be asynchronous, and the specific identification speed is related to number of obstacles in the image, complexity of obstacle shape, and computing power of the camera that handles the obstacles.

In detail, the single camera obtains a degree of confidence in the obstacle identification process. The degree of confidence is generally automatically determined by an obstacle identification algorithm, and mainly reflects a probability that the obstacle recognition result is correct. When the degree of confidence is greater than a threshold, the identified obstacles are regarded as effective obstacles. The effective obstacles are tracked by the single camera, and the degree of confidence of the effective obstacles of each camera may be different.

At step S120, in response to a triggering condition of a main camera in the cameras to fusion of cross-camera obstacles being satisfied, a mapping relation between local identifiers of the obstacles in the cameras and global identifiers is established according to the obstacle tracking result of each of the cameras.

In this embodiment, the main camera is a relatively important camera with a high priority in the vehicle. For example, the shooting range of the main camera is critical for driving control, or the hardware performance of the main camera is optimized.

If the main camera triggers obstacle fusion, it is ensured that all obstacle tracking results to be fused by the main camera will be fused in time. For cameras other than the main camera, since different cameras capture images at different frequencies, one or several frames of images in partial of the cameras may not be fused in time, resulting in frame loss.

Obstacle fusion refers to associating obstacles tracked by different cameras. Since the obstacles tracked by different cameras are labeled with local identifiers, the same obstacle that captured by different cameras may be labeled with different local identifiers. If the obstacle identification result labeled with the local identifiers is pushed to an automatic driving control strategy module, the same obstacle is treated as two obstacles by mistake, resulting in driving control errors. Therefore, the obstacles tracked by different cameras are associated, and then the tracking results are pushed to the subsequent decision module to obtain a more accurate driving control strategy.

Fusing obstacles mainly refers to fusing the effective obstacles. The identification process of the effective obstacles may be seen in the aforementioned process. In this embodiment, after the obstacle fusion is triggered by the main camera, each camera may determine whether it is an effective obstacle while fusing. If the obstacle is an effective obstacle, cross-camera fusion is performed, and if the obstacle is not an effective obstacle, the obstacle is discarded.

Alternatively, the triggering condition of the main camera in the at least two cameras to fusion of cross-camera obstacles is satisfied, when detecting that an obstacle tracking result of the main camera is obtained after identifying and tracking obstacles in a current image of the main camera is completed.

The main camera is a preset camera or is determined according to a concerning area during driving of a vehicle.

In this embodiment, the main camera may be a preset camera. For example, the camera in front of the vehicle is set as the main camera. By default, the road conditions in front of the vehicle are most important for driving. The main camera may also be determined according to the concerning area during driving of the vehicle. In detail, the concerning area refers to the area that the vehicle focuses on during the driving. For example, when the vehicle is driving on a straight road, the concerning area of the vehicle is a road section in front of the vehicle, and the main camera of the vehicle is a camera installed in front of the vehicle. When the vehicle turns left, the concerning area of the vehicle is the road section on the left, and the main camera is changed to the camera on the left of the vehicle.

In this embodiment, an obstacle tracking result refers to a data result obtained after the obstacles are tracked, which may include feature data such as obstacle images, obstacle contours, positions in the image. The global identifier is a unique identifier used in the vehicle control system, which uniquely distinguishes all obstacles tracked by all the cameras of the vehicle, for example, Global_Track_ID is named for distinguishing. After the obstacle tracking results are obtained, a mapping relationship is established between the local identifiers and the global identifiers in the obstacle tracking results.

Alternatively, establishing the mapping relation between the local identifiers of the obstacles in the cameras and the global identifiers according to the obstacle tracking results of each of the cameras includes:

if it is recognized that an obstacle tracking result of a current image of each camera has an existing local identifier in historical images, associating the obstacle tracking result of the current image with the global identifier corresponding to the existing local identifier; and if it is recognized that an obstacle tracking result of a current image of each camera does not have a local identifier in the historical images, mapping the local identifier to a newly created global identifier.

In this embodiment, if an obstacle in the current image identified by each camera has a corresponding local identifier in the historical images, it means that this obstacle has been identified by the camera. Therefore, the obstacle tracking result of this obstacle corresponds to the global identifier of this obstacle.

If the obstacle in the current image identified by each camera does not have a corresponding local identifier in the historical images, it means that this obstacle is a new obstacle, then a local identifier is set for this obstacle and a new global identifier is created for mapping.

At step S130, similarities of obstacles are determined according to the obstacle tracking result of each of the cameras, and fusion of the global identifiers on the same obstacle is performed according to the similarities.

In this embodiment, the obstacles in the obstacle tracking result are compared in pairs to determine the similarities, and the obstacles compared in pairs with different local identifiers whose similarity meets the requirements are regarded as the same obstacle, which may be related to the same global identifier.

At step S140, obstacle final tracking results labeled with the global identifiers are obtained. In this embodiment, the obstacle tracking results corresponding to the same global identifier are summarized, and the purpose of tracking the same obstacle can be achieved by processing obstacles labeled by the same global identifier. The obstacle tracking results include positions of the obstacles, motion trajectories of the obstacles, predicted values of the motion trajectories of the obstacles, and appearances of the obstacles.

This embodiment in the disclosure has the following advantages or beneficial effects. The obstacle tracking results are obtained through the industrial personal computer, and further the similarities of the obstacle is determined according to the mapping relations between the local identifiers and the global identifiers of the obstacles, and the final obstacle tracking results are determined according to the similarities. The fusion processing of obstacles by a plurality of cameras may improve the accuracy of obstacle tracking. In this embodiment, the main camera combines the cross-camera obstacles, which ensures that the key obstacle tracking results are not lost.

Embodiment 2

Figure 2:
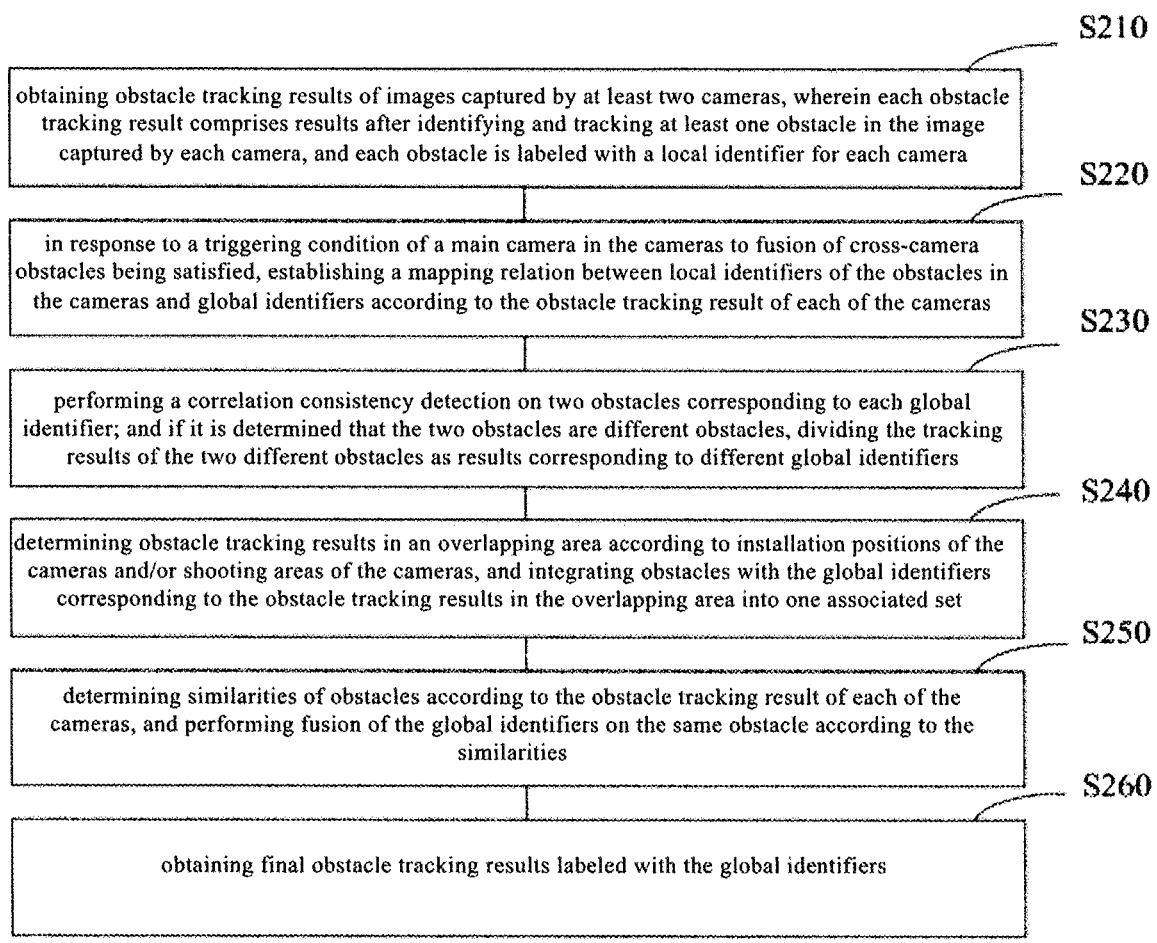
FIG. 2 is a flowchart of a cross-camera obstacle tracking method according to Embodiment 2 of the present disclosure.

FIG. 2 is a flowchart of a cross-camera obstacle tracking method according to Embodiment 2 of the present disclosure. This embodiment is used in a situation where an automatic driving vehicle identifies and tracks obstacles in captured images. The method may be executed by a cross-camera obstacle tracking device, which may be implemented by software and/or hardware, or integrated into an electronic device.

Figure 3:
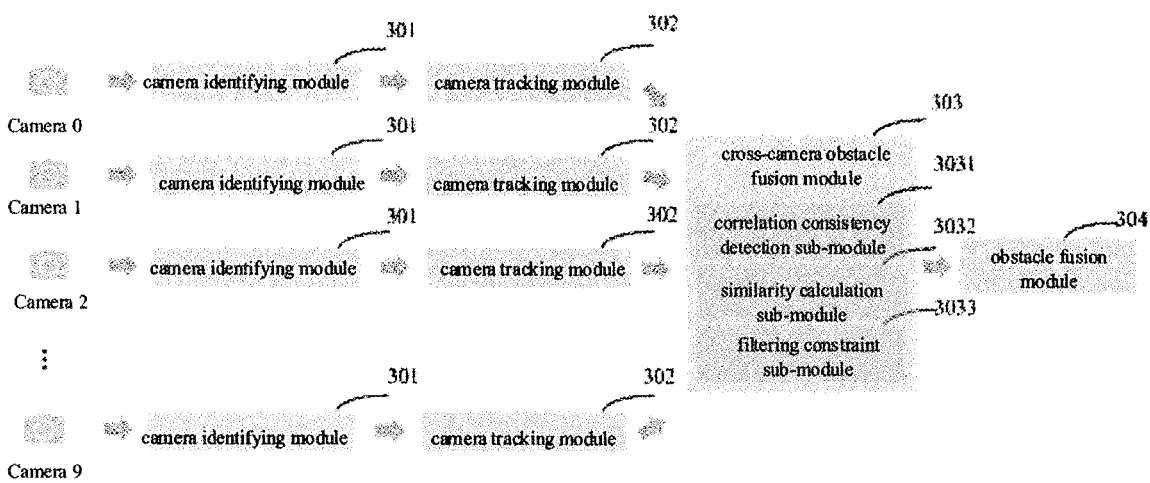
FIG. 3 is a schematic diagram of a framework of an obstacle fusion process according to Embodiment 2 of the present disclosure.

FIG. 3 is a schematic diagram of a framework of an obstacle fusion process according to Embodiment 2 of the present disclosure. This diagram includes at least two camera identifying modules 301, at least two camera tracking modules 302, a cross-camera obstacle fusion module 303, a correlation consistency detection sub-module 3031, a similarity calculation sub-module 3032, a filtering constraint sub-module 3033, and an obstacle fusion module 304. When the camera is provided with a chip and can handle obstacle identification and tracking independently, the at least two camera identifying modules 301 and the at least two camera tracking modules 302 are configured in the camera, and the cross-camera obstacle fusion module 303, the correlation consistency detection sub-module 3031, the similarity calculation sub-module 3032, the filtering constraint sub-module 3033, and the obstacle fusion module 304 are configured in an industrial personal computer. When the camera is not provided with a chip, and the above-mentioned modules are not included in the camera, the camera only has a shooting function. The chip configured for the camera in this application may be integrated into the camera, or may be configured outside the camera to be connected to the camera for processing related functions of obstacle identification and tracking. The obstacle fusion module 304 outputs the results to a driving decision module of an on-board automatic control system. The at least two camera identifying modules 301 are used for a single camera to identify obstacles, and the at least two camera tracking modules 302 are used for the single camera to track the identified obstacles, and to output the tracking results to the cross-camera obstacle fusion module 303. The cross-camera obstacle fusion module 303 performs processes such as correlation consistency detection and similarity calculation on the tracking results, and the obstacle fusion module 304 performs final obstacle fusion process.

Further, camera 0-camera 9 in the figure may be hot-plugged, so that modules of a single camera may be easily replaced. For the driving decision module of the on-board automatic control system connected to the cameras, there is no need to pay attention to change of architecture modules in the process of obstacle tracking, thus driving strategy may be executed independently.

In detail, as illustrated in FIG. 2, a cross-camera obstacle tracking method according to this embodiment is provided, and the method may include the following steps.

At step S210, obstacle tracking results of images captured by at least two cameras are obtained, in which each obstacle tracking result includes results after identifying and tracking at least one obstacle in an image captured by each camera, and each obstacle is labeled with a local identifier.

At step S220, in response to a triggering condition of a main camera in the cameras to fusion of cross-camera obstacles being satisfied, a mapping relation between local identifiers of the obstacles in the cameras and global identifiers is established according to the obstacle tracking result of each of the cameras.

At step S230, a correlation consistency detection is performed on two obstacles corresponding to each global identifier, and if it is determined that the two obstacles are different obstacles, the tracking results of the two different obstacles are divided as results corresponding to different global identifiers.

In this embodiment, the correlation consistency detection refers to detecting whether two or more obstacles corresponding to the same global identifier are the same obstacle, by comparing the two obstacles corresponding to the same global identifier, if the two obstacles are the same, it means that the two obstacles compared are the same obstacle, if the two obstacles are different, it means that the two obstacles compared are different obstacles, and the tracking results of the obstacles identified as different obstacles in this global identifier are divided as different global identifiers.

Alternatively, performing the correlation consistency detection on the two obstacles corresponding to each global identifier includes: for the two obstacles corresponding to each global identifier, according to the tracking results of the two obstacles in each camera, identifying at least one of position consistency, contour consistency and volume consistency to determine a correlation consistency detection result.

In this embodiment, position consistency means that each camera has an obstacle tracking result for the obstacle, that is, each camera can obtain the position of the obstacle, and if the obstacle has appeared in consecutive frames, the direction and speed of the obstacle may be determined based on the consecutive frames. If there is a big deviation in the directions and speeds of the obstacles, it means that these obstacles may not be the same.

In detail, by determining whether the positions of two obstacles in different cameras are the same, it is determined whether the two obstacles are the same obstacle. For example, the correlation consistency detection is performed between obstacle A and obstacle B, obstacle A is at the left position of the front camera, and obstacle B is at the right position of the left camera, then it is determined that obstacle A and obstacle B may be the same obstacle. If obstacle A is at the left position of the front camera and obstacle B is at the right position of the right camera, it means that obstacle A and obstacle B are different obstacles. Further, when the contours of obstacle A and obstacle B are the same, it is determined that obstacle A and obstacle B are the same obstacle. If the contour of obstacle A is circular, the contour of obstacle B is rectangular, it means that obstacle A and obstacle B are different obstacles.

The correlation consistency detection may be performed by determining the volume of the two obstacles. In detail, minimum bounding rectangle frames of the obstacles may be labeled in the image, that is, 2d frames. Detection is performed by height ratio of the 2d frames. The height ratio of the same obstacle in images captured by the two cameras is approximately equal to focal length ratio of the two cameras, but if the corresponding height ratio and the focal length ratio differ greatly, it means that the two obstacles for correlation consistency detection are not the same obstacle.

In this embodiment, the correlation consistency detection is performed on the two obstacles according to position consistency, contour consistency or volume consistency, or the combinations thereof.

At step S240, according to installation positions of the cameras and/or shooting areas of the cameras, obstacle tracking results in an overlapping area are determined, and obstacles with the global identifiers corresponding to the obstacle tracking results in the overlapping area are integrated into one associated set.

In this embodiment, the associated set is used as a range for determining the similarities of obstacles. For example, the shooting areas of the camera in front of the vehicle and the camera on the front left of the vehicle are overlapped, and the obstacle tracking results in the above overlapping area are integrated into one associated set. It is more likely that the obstacles in the overlapping area between the camera in front of the vehicle and the camera of the front left of the vehicle are the same obstacle. The obstacles are integrated into the same associated set, and then the obstacles in the associated set are compared to obtain the similarities, thereby reducing times of comparison.

In specific implementation, according to installation positions of the cameras on the vehicle, obstacles captured by some cameras may be integrated into one associated set by default. Obstacles captured by each camera may be classified into a plurality of different associated sets. Optionally, according to the installation positions and the shooting areas of the cameras, the overlapping area is determined, and the obstacle tracking results that appear in the overlapping area may be integrated into one associated set.

At step S250, similarities of the obstacles are determined according to the obstacle tracking result of each of the cameras, and fusion of the global identifier on the same obstacle is performed according to the similarities.

Alternatively, determining the similarities of the obstacles according to the obstacle tracking result of each of the cameras, and performing the fusion of the global identifiers on the same obstacle according to the similarities, includes:

for the obstacle tracking results corresponding to different global identifiers, performing similarity calculation on position information and/or contour volume information in pairs according to the obstacle tracking result of each of the cameras, to generate a similarity matrix;

performing an obstacle matching according to the similarity matrix to obtain a matching result, and determining the global identifiers belonging to the same obstacle according to the matching result; and combining and fusing the global identifiers of the same obstacle.

In this embodiment, the similarity matrix is used to determine the degree of similarity of obstacles corresponding to different global identifiers, and the similarity matrix may be calculated by geometric contours or by location features. When the similarity matrix is greater than the threshold, it means that the obstacles corresponding to different global identifiers are the same obstacle, then the obstacles are integrated into obstacles corresponding to the same global identifier, and the same obstacle is combined.

Alternatively, before obtaining the similarity matrix, the method further includes:

performing constraint filtering on the obstacle tracking results corresponding to different global identifiers, in which conditions for constraint filtering include at least one of distance constraint, constraint on direction angle difference of rays connected to a center of a vehicle, and epipolar geometry constraint.

In this embodiment, the distance constraint refers to determining whether the obstacles are the same obstacle by distance differences of the obstacles in the image. For example, the obstacle corresponding to a global identifier is at a distance of 100 meters from a vehicle in the image, and the obstacle corresponding to another global identifier is at a distance of 1000 meters from the vehicle in the image. Therefore, it is determined that the two obstacles are not the same obstacle.

The constraint on direction angle difference of the rays connected to the center of the vehicle refers to the angle between the obstacle and a center axis of the vehicle. If an angle difference is large, it means that the obstacles are different obstacles.

The epipolar geometric constraint refers to a special geometric relation between two images generated at two camera positions.

At step S260, the final obstacle tracking results labeled with the global identifiers are obtained.

Alternatively, obtaining the final obstacle tracking results labeled with the global identifiers includes:

obtaining obstacle tracking results corresponding to one or more local identifiers mapped by each of the global identifiers; and performing a circular state process on the obstacle tracking results corresponding to the one or more local identifiers to determine a final obstacle tracking result corresponding to each of the global identifiers.

The final tracking result is transmitted to a driving decision module of an on-board automatic control system.

In this embodiment, the circular state process is performed on the obstacle tracking results corresponding to the local identifiers that have a mapping relation with the global identifier. The circular state may refer to three-dimensional synthesis of the images of the obstacles corresponding to the local identifiers, and the images are displayed on a screen of the vehicle in the form of a virtual top view or generate image pictures to obtain the final tracking result of the corresponding obstacle. The angle of view in the virtual top view or the final image picture dynamically moves according to the vehicle's trajectory, which can provide a 360-degree image surrounding the vehicle. Eventually, the image of the same obstacle in different cameras can be displayed, and the final tracking result is sent to the on-board automatic control system. After receiving the above results, the on-board automatic control system instructs the vehicle how to drive next, whether to avoid obstacles or stop the vehicle.

This embodiment in the disclosure has the following advantages or beneficial effects. With performing the correlation consistency detection of obstacles and dividing the obstacles into different associated sets, the same obstacle is combined, and the final tracking result is transmitted to the driving decision module of the on-board automatic control system. According to the correlation consistency detection of obstacles and the obstacles divided into different associated sets, the same obstacle may be accurately combined, so that the on-board automatic control system may accurately track the obstacles.

Embodiment 3

Figure 4:
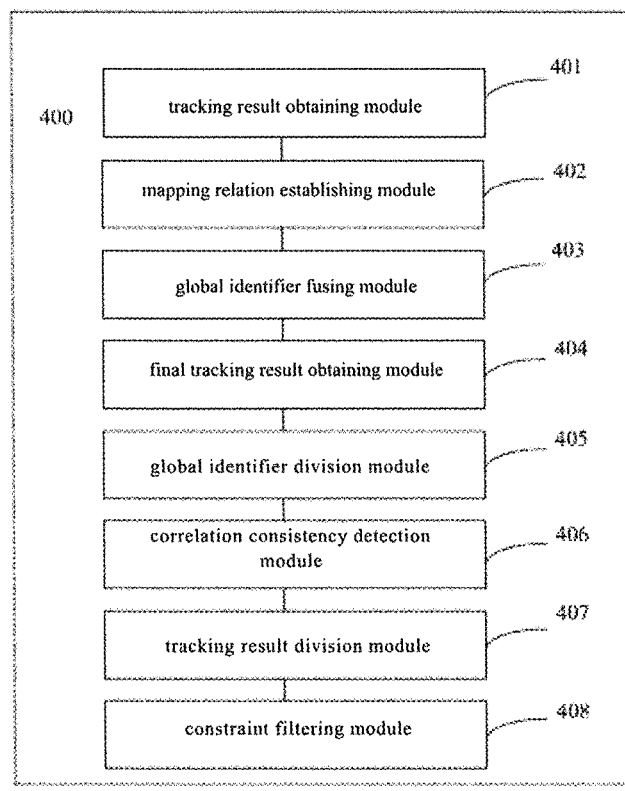
FIG. 4 is a schematic diagram of a cross-camera obstacle tracking apparatus according to Embodiment 3 of the present disclosure.

FIG. 4 is a schematic diagram of a cross-camera obstacle tracking apparatus according to Embodiment 3 of the present disclosure. The cross-camera obstacle tracking method according to the embodiments of the present disclosure may be executed, and the method has corresponding functional modules and beneficial effects. As illustrated in FIG. 4, the apparatus 400 may include: a tracking result obtaining module 401, a mapping relation establishing module 402, a global identifier fusing module 403, and a final tracking result obtaining module 404.

The tracking result obtaining module 401 is configured to obtain obstacle tracking results of images captured by at least two cameras, wherein each obstacle tracking result comprises results after identifying and tracking at least one obstacle in the images captured by each camera, and each obstacle is labeled with a local identifier.

The mapping relation establishing module 402 is configured to, in response to a triggering condition a main camera in the cameras to fusion of cross-camera obstacles being satisfied, establish a mapping relation between the local identifiers of obstacles in the cameras and global identifiers according to the obstacle tracking result of each of the cameras.

The global identifier fusing module 403 is configured to determine similarities of the obstacles according to the obstacle tracking result of each of the cameras, and perform fusion of the global identifiers on the same obstacle according to the similarities.

The final tracking result obtaining module 404 is configured to obtain final obstacle tracking results labeled with the global identifiers.

The mapping relation establishing module 402 is configured to when detecting that an obstacle tracking result of the main camera is obtained after identifying and tracking of obstacles in a current image of the main camera is completed, determine that the trigger condition is satisfied. The main camera is a preset camera or is determined according to a concerning area during driving of a vehicle.

The apparatus 400 further includes: a global identifier division module 405, configured to determine obstacle tracking results in an overlapping area, according to installation positions of the cameras and/or shooting areas of the cameras, and integrate obstacles with the global identifiers corresponding to the obstacle tracking results in the overlapping area into one associated set. The associated set is used as a range for determining the similarities of obstacles.

The final tracking result obtaining module 404 is configured to:

obtain obstacle tracking results corresponding to one or more local identifiers mapped by each of the global identifiers; and perform a circular state process on the obstacle tracking results corresponding to the one or more local identifiers to determine a final obstacle tracking result corresponding to each of the global identifiers.

The final tracking result is transmitted to a driving decision module of an on-board automatic control system.

The mapping relation establishing module 402 is configured to if it is recognized that an obstacle tracking result of a current image of each camera has an existing local identifier in historical images, associate the obstacle tracking result of the current image with the global identifier corresponding to the existing local identifier; and if it is recognized that an obstacle tracking result of a current image of each camera does not have a local identifier in the historical images, map the local identifier to a newly created global identifier.

The apparatus 400 further includes a correlation consistency detection module 406 and a tracking result division module 407.

The correlation consistency detection module 406 is configured to perform a correlation consistency detection on two obstacles corresponding to each global identifier; and The tracking result division module 407 is configured to if it is determined that the two obstacles are different obstacles, divide the tracking results of the two different obstacles as results corresponding to different global identifiers.

The correlation consistency detection module 406 is specifically configured to for the two obstacles corresponding to each global identifier, according to the tracking results of the two obstacles in each camera, identify at least one of position consistency, contour consistency and volume consistency to determine a correlation consistency detection result.

The global identifier fusing module 403 is configured to:

for the obstacle tracking results corresponding to different global identifiers, perform similarity calculation on position information and/or contour volume information in pairs according to the obstacle tracking result of each of the cameras, to generate a similarity matrix;

perform an obstacle matching according to the similarity matrix to obtain a matching result, and determine the global identifiers belonging to the same obstacle according to the matching result; and combine and fuse the global identifiers of the same obstacle.

The apparatus 400 further includes a constraint filtering module 408. The constraint filtering module 408 is configured to perform constraint filtering on the obstacle tracking results corresponding to different global identifiers, in which conditions for constraint filtering comprise at least one of distance constraint, constraint on direction angle difference of rays connected to a center of a vehicle, and epipolar geometry constraint.

This embodiment in the disclosure has the following advantages or beneficial effects. The obstacle tracking results are obtained through the industrial personal computer, and the similarities of the obstacles are determined according to the mapping relations between the local identifiers and the global identifiers of the obstacles, and the final tracking results of the obstacles are determined according to the similarities. The fusion process of the obstacles executed by a plurality of cameras may improve the accuracy of obstacle tracking.

According to the embodiments of the present disclosure, the present disclosure also provides an electronic device and a readable storage medium.

Figure 5:
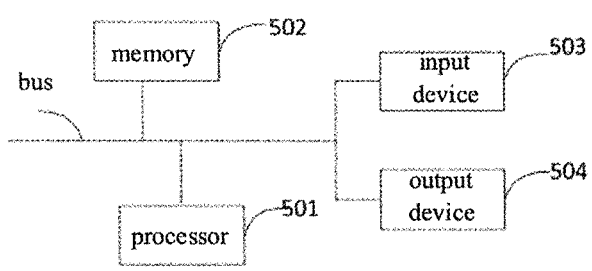
FIG. 5 is a block diagram of an electronic device to implement the cross-camera obstacle tracking method according to an embodiment of the present disclosure.

FIG. 5 is a block diagram of an electronic device to implement the cross-camera obstacle tracking method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 5, the electronic device includes: one or more processors 501, a memory 502, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 501 is taken as an example in FIG. 5.

The memory 502 is a non-transitory computer-readable storage medium according to the present disclosure. The memory stores instructions executable by at least one processor, so that the at least one processor executes the cross-camera obstacle tracking method according to the present disclosure. The non-transitory computer-readable storage medium of the present disclosure stores computer instructions, which are used to cause a computer to execute the cross-camera obstacle tracking method according to the present disclosure.

As a non-transitory computer-readable storage medium, the memory 502 is configured to store non-transitory software programs, non-transitory computer executable programs and modules, such as program instructions/modules corresponding to the cross-camera obstacle tracking method in the embodiment of the present disclosure (For example, the modules shown in FIG. 4). The processor 501 executes various functional applications and data processing of the server by running non-transitory software programs, instructions, and modules stored in the memory 502, that is, implementing the cross-camera obstacle tracking method in the foregoing method embodiment.

The memory 502 may include a storage program area and a storage data area, where the storage program area may store an operating system and application programs required for at least one function. The storage data area may store data created according to the use of the electronic device, and the like. In addition, the memory 502 may include a high-speed random access memory, and a non-transitory memory, such as at least one magnetic disk storage device, a flash memory device, or other non-transitory solid-state storage device. In some embodiments, the memory 502 may optionally include a memory remotely disposed with respect to the processor 501, and these remote memories may be connected to the electronic device through a network. Examples of the above network include, but are not limited to, the Internet, an intranet, a local area network, a mobile communication network, and combinations thereof.

The electronic device for implementing the cross-camera obstacle tracking method may further include: an input device 503 and an output device 504. The processor 501, the memory 502, the input device 503, and the output device 504 may be connected through a bus or in other manners. In FIG. 5, the connection through the bus is taken as an example.

The input device 503 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 804 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLD s), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the technical solution of the embodiments of the present disclosure, the obstacle tracking results are obtained through the industrial personal computer, and the similarities of the obstacles are determined according to the mapping relations between the local identifiers and the global identifiers of the obstacles, and the final tracking results of the obstacles are determined according to the similarities. The fusion process of obstacles executed by a plurality of cameras may improve the accuracy of obstacle tracking.

Embodiment 4

According to the cross-camera obstacle tracking system according to Embodiment 4 of the present disclosure, this embodiment includes at least two vehicle-mounted cameras, and further includes the electronic device described in this embodiment, and the electronic device is an industrial personal computer.

Alternatively, the camera is configured to capture images surrounding the vehicle, and the industrial personal computer is configured to obtain images collected by the at least two on-board cameras after photographing surrounding environment of a vehicle, and to perform obstacle identifying and tracking on each of the images to obtain the obstacle tracking results.

Alternatively, the camera is configured to capture images surrounding the vehicle, to identify and track obstacles based on the captured images, and the obstacles are labeled with local identifiers.

The industrial personal computer is configured to obtain the obstacle tracking results transmitted by the at least two on-board cameras.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A cross-camera obstacle tracking method, comprising:
obtaining obstacle tracking results of images captured by at least two cameras, wherein each obstacle tracking result comprises results after identifying and tracking at least one obstacle in an image captured by each camera, and each obstacle is labeled with a local identifier for each camera;
in response to a triggering condition of a main camera in the cameras to fusion of cross-camera obstacles being satisfied, establishing a mapping relation between local identifiers of the obstacles in the cameras and global identifiers according to the obstacle tracking result of each of the cameras;
determining similarities of obstacles according to the obstacle tracking result of each of the cameras, and performing fusion of the global identifiers on same obstacles according to the similarities; and
obtaining final obstacle tracking results labeled with the global identifiers;
wherein the triggering condition of the main camera in the at least two cameras to fusion of cross-camera obstacles is satisfied, when detecting that an obstacle tracking result of the main camera is obtained after identifying and tracking obstacles in a current image of the main camera is completed;
wherein a priority level of the main camera in driving control is higher than priority levels of other cameras in driving control;
wherein determining the similarities of the obstacles according to the obstacle tracking result of each of the cameras, and performing the fusion of the global identifiers on the same obstacle according to the similarities, comprises:
for the obstacle tracking results corresponding to different global identifiers, performing similarity calculation on position information and/or contour volume information in pairs according to the obstacle tracking result of each of the cameras, to generate a similarity matrix;
performing an obstacle matching according to the similarity matrix to obtain a matching result, and determining the global identifiers belonging to the same obstacle according to the matching result; and
combining and fusing the global identifiers belonging to the same obstacle.

2. The method according to claim 1, wherein the main camera is a preset camera or is determined according to a concerning area during driving of a vehicle.

3. The method according to claim 1, wherein before determining the similarities of obstacles according to the obstacle tracking result of each of the cameras, the method further comprises:
determining obstacle tracking results in an overlapping area according to installation positions of the cameras and/or shooting areas of the cameras, and integrating obstacles with the global identifiers corresponding to the obstacle tracking results in the overlapping area into one associated set;
wherein, the associated set is used as a range for determining the similarities of obstacles.

4. The method according to claim 1, wherein obtaining the final obstacle tracking results labeled with the global identifiers comprises:
obtaining obstacle tracking results corresponding to one or more local identifiers mapped by each of the global identifiers; and
performing a circular state process on the obstacle tracking results corresponding to the one or more local identifiers to determine a final obstacle tracking result corresponding to each of the global identifiers;
wherein, the final tracking result is transmitted to a driving decision module of an on-board automatic control system.

5. The method according to claim 1, wherein, establishing the mapping relation between the local identifiers of the obstacles in the cameras and the global identifiers according to the obstacle tracking results of each of the cameras comprises:
if it is recognized that an obstacle tracking result of a current image of each camera has an existing local identifier in historical images, associating the obstacle tracking result of the current image with the global identifier corresponding to the existing local identifier; and
if it is recognized that an obstacle tracking result of a current image of each camera if it is recognized that an obstacle tracking result of a current image of each camera does not have a local identifier in the historical images, mapping the local identifier to a newly created global identifier.

6. The method according to claim 5, wherein after establishing the mapping relation between the local identifiers of the obstacles in the cameras and the global identifiers according to the obstacle tracking results of each of the cameras, the method further comprises:
performing a correlation consistency detection on two obstacles corresponding to each global identifier; and
if it is determined that the two obstacles are different obstacles, dividing the tracking results of the two different obstacles as results corresponding to different global identifiers.

7. The method according to claim 6, wherein performing the correlation consistency detection on the two obstacles corresponding to each global identifier comprises:
for the two obstacles corresponding to each global identifier, identifying at least one of position consistency, contour consistency and volume consistency according to the tracking results of the two obstacles in each camera to determine a correlation consistency detection result.

8. The method according to claim 1, wherein before obtaining the similarity matrix, the method further comprises:
performing constraint filtering on the obstacle tracking results corresponding to different global identifiers, wherein conditions for constraint filtering comprise at least one of distance constraint, constraint on direction angle difference of rays connected to a center of a vehicle, and epipolar geometry constraint.

9. The method according to claim 1, wherein an execution subject of the method is an industrial personal computer, and obtaining the obstacle tracking results of the images captured by the at least two cameras comprises:

obtaining images captured by the at least two cameras on a vehicle after photographing surrounding environment of the vehicle; and identifying and tracking obstacles in each of the images to obtain the obstacle tracking results.

10. The method according to claim 1, wherein an execution subject of the method is an industrial personal computer, and obtaining the obstacle tracking results of the images captured by the at least two cameras comprises:

obtaining the obstacle tracking results transmitted by the at least two cameras in a vehicle, wherein the obstacle tracking results are obtained by the cameras through identifying and tracking the obstacles based on the captured images and setting the local identifiers.

11. A cross-camera obstacle tracking system, comprising at least two cameras, and an electronic device, wherein the electronic device is configured to, obtain obstacle tracking results of images captured by at least two cameras, wherein each obstacle tracking result comprises results after identifying and tracking at least one obstacle in an image captured by each camera, and each obstacle is labeled with a local identifier for each camera;

in response to a triggering condition of a main camera in the cameras to fusion of cross-camera obstacles being satisfied, establish a mapping relation between local identifiers of the obstacles in the cameras and global identifiers according to the obstacle tracking result of each of the cameras;

determine similarities of obstacles according to the obstacle tracking result of each of the cameras, and perform fusion of the global identifiers on same obstacles according to the similarities; and obtain final obstacle tracking results labeled with the global identifiers;

wherein the triggering condition of the main camera in the at least two cameras to fusion of cross-camera obstacles is satisfied, when detecting that an obstacle tracking result of the main camera is obtained after identifying and tracking obstacles in a current image of the main camera is completed;

wherein a priority level of the main camera in driving control is higher than priority levels of other cameras in driving control;

wherein the electronic device is configured to, for the obstacle tracking results corresponding to different global identifiers, perform similarity calculation on position information and/or contour volume information in pairs according to the obstacle tracking result of each of the cameras, to generate a similarity matrix;

perform an obstacle matching according to the similarity matrix to obtain a matching result, and determine the global identifiers belonging to the same obstacle according to the matching result; and combine and fuse the global identifiers belonging to the same obstacle.

12. The system according to claim 11, wherein the electronic device is an industrial personal computer, the at least two cameras are at least two on-board cameras.

13. The system according to claim 12, wherein, each camera is configured to capture images surrounding a vehicle, and the industrial personal computer is configured to obtain images collected by the at least two on-board cameras after photographing surrounding environment of a vehicle, and to perform obstacle identifying and tracking on each of the images to obtain the obstacle tracking results.

14. The system according to claim 12, wherein each camera is configured to capture images surrounding a vehicle, to identify and track obstacles based on the captured images, and the obstacles are labeled with local identifiers; and the industrial personal computer is configured to obtain the obstacle tracking results transmitted by the at least two on-board cameras.

15. The system according to claim 11, the electronic device is configured to, determine obstacle tracking results in an overlapping area according to installation positions of the cameras and/or shooting areas of the cameras, and integrate obstacles with the global identifiers corresponding to the obstacle tracking results in the overlapping area into one associated set, wherein, the associated set is used as a range for determining the similarities of obstacles.

16. The system according to claim 11, the electronic device is configured to, obtain obstacle tracking results corresponding to one or more local identifiers mapped by each of the global identifiers; and perform a circular state process on the obstacle tracking results corresponding to the one or more local identifiers to determine a final obstacle tracking result corresponding to each of the global identifiers;

wherein, the final tracking result is transmitted to a driving decision module of an on-board automatic control system.

17. The system according to claim 11, the electronic device is configured to, if it is recognized that an obstacle tracking result of a current image of each camera has an existing local identifier in historical images, associate the obstacle tracking result of the current image with the global identifier corresponding to the existing local identifier; and if it is recognized that an obstacle tracking result of a current image of each camera if it is recognized that an obstacle tracking result of a current image of each camera does not have a local identifier in the historical images, map the local identifier to a newly created global identifier.

18. A non-transitory computer-readable storage medium storing computer instructions, wherein the computer instructions are used to enable the computer execute a cross-camera obstacle tracking method, the method comprises:

obtaining obstacle tracking results of images captured by at least two cameras, wherein each obstacle tracking result comprises results after identifying and tracking at least one obstacle in an image captured by each camera, and each obstacle is labeled with a local identifier for each camera;

in response to a triggering condition of a main camera in the cameras to fusion of cross-camera obstacles being satisfied, establishing a mapping relation between local identifiers of the obstacles in the cameras and global identifiers according to the obstacle tracking result of each of the cameras;

determining similarities of obstacles according to the obstacle tracking result of each of the cameras, and performing fusion of the global identifiers on same obstacles according to the similarities; and obtaining final obstacle tracking results labeled with the global identifiers;

wherein the triggering condition of the main camera in the at least two cameras to fusion of cross-camera obstacles is satisfied, when detecting that an obstacle tracking result of the main camera is obtained after identifying and tracking obstacles in a current image of the main camera is completed;

wherein a priority level of the main camera in driving control is higher than priority levels of other cameras in driving control;

wherein determining the similarities of the obstacles according to the obstacle tracking result of each of the cameras, and performing the fusion of the global identifiers on the same obstacle according to the similarities, comprises:

for the obstacle tracking results corresponding to different global identifiers, performing similarity calculation on position information and/or contour volume information in pairs according to the obstacle tracking result of each of the cameras, to generate a similarity matrix;

performing an obstacle matching according to the similarity matrix to obtain a matching result, and determining the global identifiers belonging to the same obstacle according to the matching result; and combining and fusing the global identifiers belonging to the same obstacle.

\* \* \* \* \*